May 31, 1960 R. L. HARDY 2,938,422
RESILIENTLY CONTROLLED DIFFERENTIAL TILTING ASSEMBLY
FOR IMAGE STABILIZATION AND AUTOMATIC
LEVELLING OF OPTICAL INSTRUMENTS
Filed Dec. 23, 1955 3 Sheets-Sheet 1
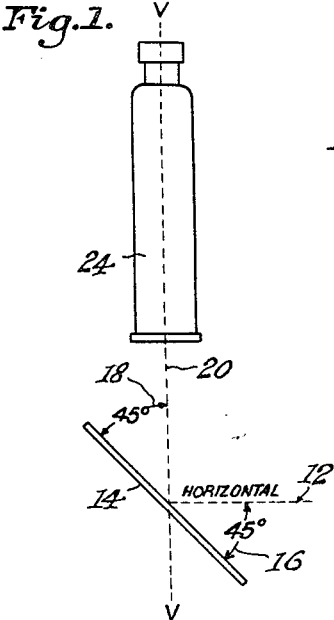
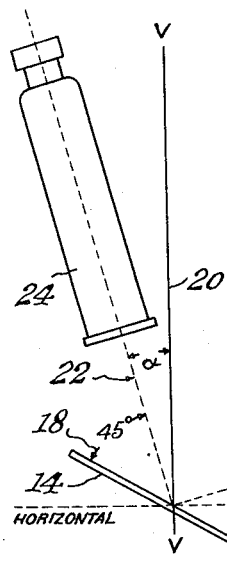
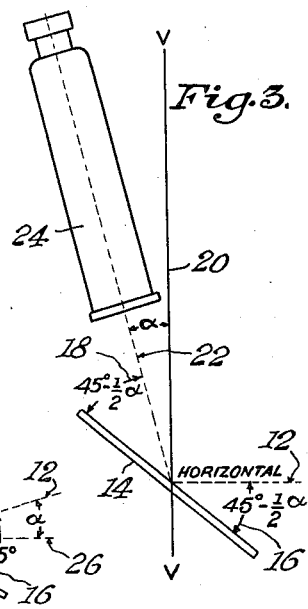
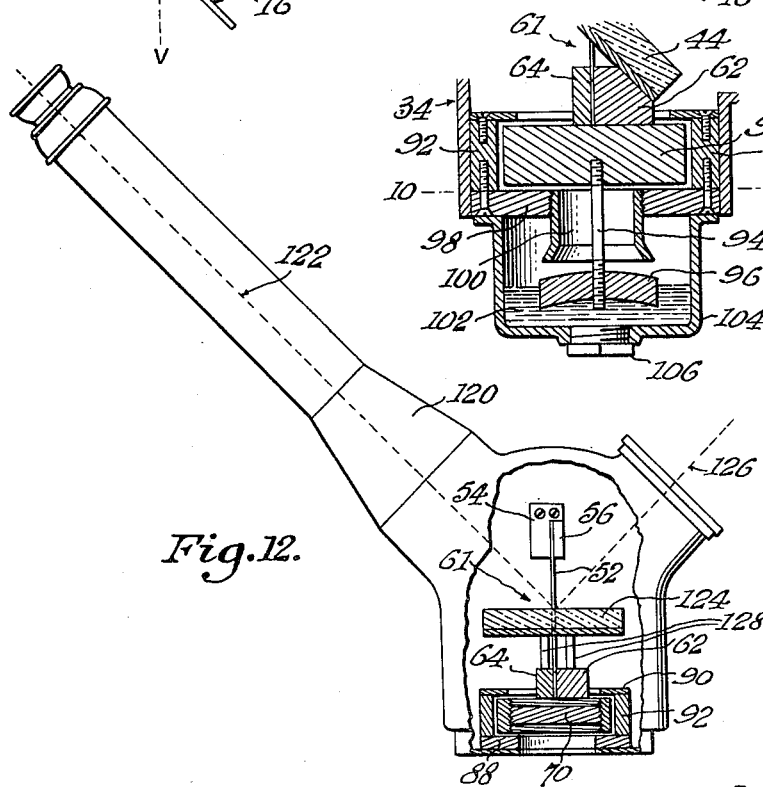
INVENTOR.
Rolland L. Hardy
BY
ATTORNEYS

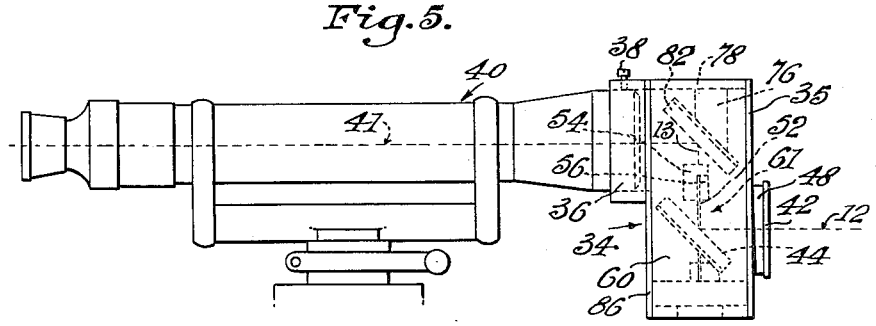
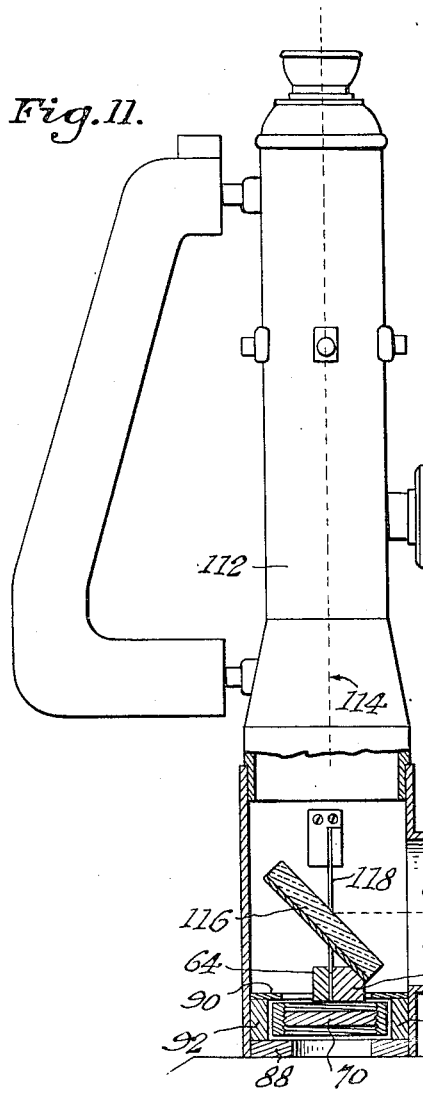
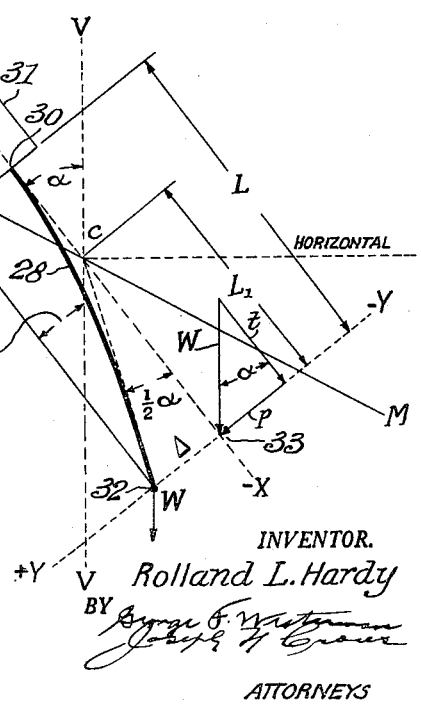

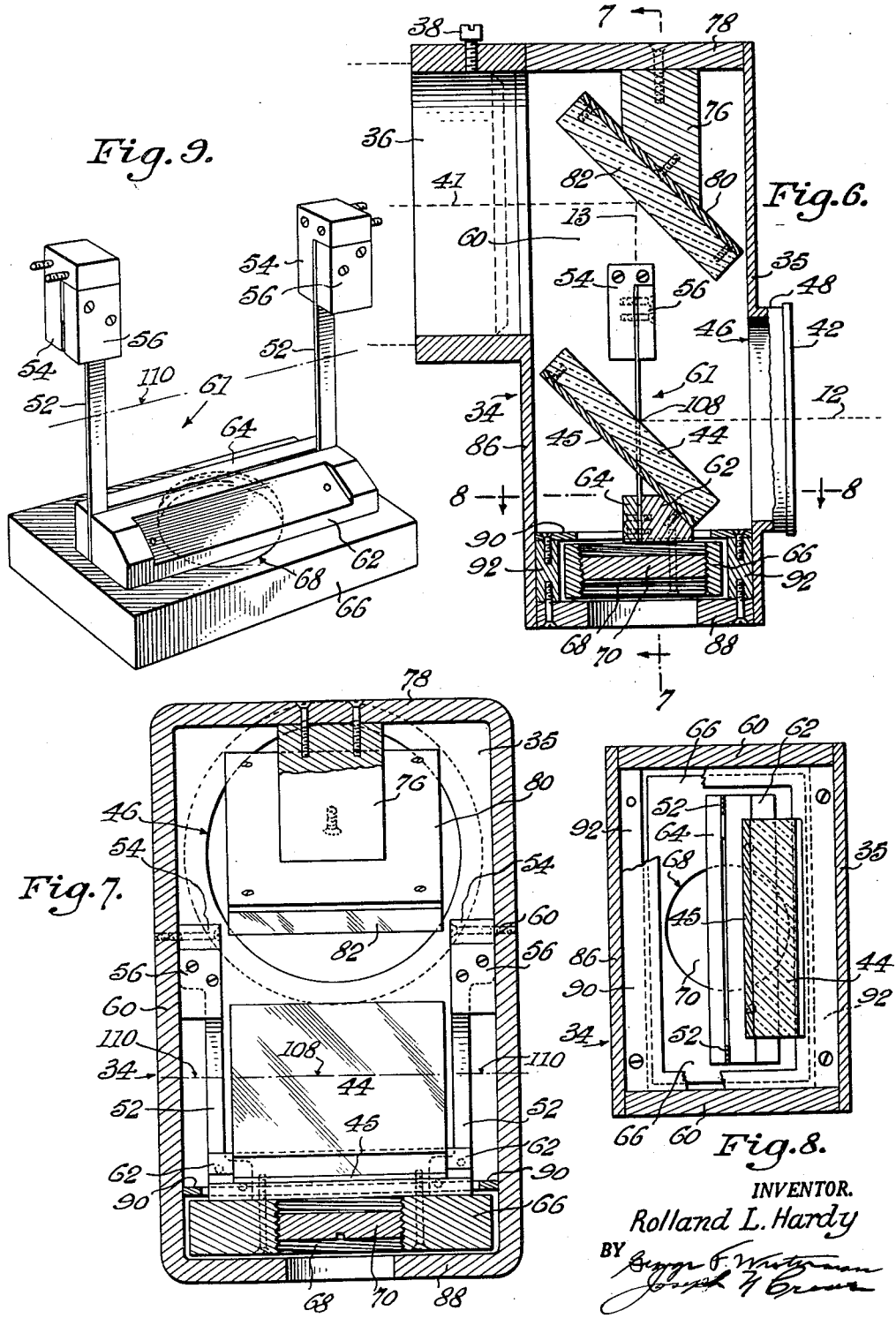

United States Patent Office 2,938,422
Patented May 31, 1960

2,938,422

RESILIENTLY CONTROLLED DIFFERENTIAL TILTING ASSEMBLY FOR IMAGE STABILIZATION AND AUTOMATIC LEVELLING OF OPTICAL INSTRUMENTS

Rolland L. Hardy, P.O. Box 36, Springfield, Va.

Filed Dec. 23, 1955, Ser. No. 555,215

9 Claims. (Cl. 88—1)

(Granted under Title 35, U.S. Code (1952), sec. 266)

The invention described herein may be manufactured and used by or for the Government for governmental purposes without the payment of any royalty thereon.

The present invention relates to a structure for optical instruments and more particularly to a resiliently controlled differential tilting assembly to be used in combination with an optical instrument to insure that an observed line of sight, that is to say, a line between the objective of an instrument such as a surveyor's level, and that point of the observed object which, as an image, appears at the intersection of the cross wires of the instrument, is truly level (horizontal) or at a predetermined fixed angle from the level, such as 30, 45, or 60 degrees, even though the instrument itself may be tilted relative to the level or desired fixed angle.

In optical instruments, and particularly in astronomical or surveying instruments, in order to obtain an observed line of sight at the horizontal or at a desired fixed angle, it has been essential that the instrument itself be level. Furthermore, in optical instruments in use today, accuracy is directly dependent upon the precision attained in levelling the instrument before taking readings. Contemporary optical instruments are provided with the conventional and time honored levelling means of spirit bubbles enclosed in glass vials. However in spite of its universal use, the spirit bubble method of levelling has several major disadvantages; it is time consuming and requires painstaking care on the part of the operator to insure even minimal precision. Furthermore, accuracy is dependent to a very large degree on the skill of the operator; a very slight error in levelling can cause a large error in the reading taken, particularly when substantial distances are involved between instrument and observed object. Also, a variation of the level of the instrument may be caused by vibration or slippage of its supports.

The instant invention solves the problems and eliminates the disadvantages presented by the conventional method of levelling by providing a means which, when attached to or integrated in an optical instrument, insures that the observed line of sight will be at the level, or at a desired fixed angle, once the operator has merely obtained a very quick and roughly approximate level on the instrument. Thus, the automatic levelling or image stabilizing device disclosed by the present invention provides a much quicker, easier, more accurate and certain means for obtaining a line of sight at the level or at a desired fixed angle than has been previously known.

It is an object of the present invention to provide a differentially flexurally pivoted differential tilting assembly with planar reflecting means mounted thereon to be used in conjunction with optical instruments to insure that the observed line of sight is at a predetermined attitude if the instrument is only roughly levelled before reading.

It is an object of the invention to provide a differentially flexurally pivoted differential tilting assembly with reflecting means mounted thereon and located near the static center thereof to be used in conjunction with optical instruments in which it is desired that the observed line of sight be at a predetermined fixed angle from the level or horizontal, to insure that such line of sight will be at the desired fixed angle even if the instrument is only roughly levelled before reading.

It is another object of this invention to provide an automatic levelling or image stabilizing device employing certain principles derived from the characteristics of cantilever beams which will automatically maintain a predetermined relation between the optical axis of an instrument and an observed line of sight such that the observed line of sight will always be at the horizontal or at a predetermined fixed angle therefrom.

It is an additional object of the invention to furnish a planar reflecting surface suspended from a flexural pivot and used in combination with an optical instrument in a manner such that the planar reflecting surface rotates at one-half the rate at which the optical axis of the instrument rotates when the instrument is rotated or tilted away from the desired observed line of sight (which may be at the level or at a fixed angle) at all small angles of tilt ($\alpha$) for which the following relationship is true:

$\frac{\tan \alpha}{2}$ is substantially equal to $\tan \frac{1}{2}\alpha$

It is a further object of the present invention to provide a levelling or image stabilizing device in combination wtih an optical instrument which will obviate the necessity of precisely levelling the instrument and which will automatically furnish the observer with a line of sight having a predetermined attitude after a quick and crudely approximate level is obtained on the instrument.

Further objects and advantages of the invention will become apparent as the description proceeds and the features of novelty will be pointed out in particularity in the appended claims.

The invention will be understood more thoroughly by reference to the accompanying drawings which show an illustrative embodiment of the construction forming the basis of the present invention. Referring to the drawings—

Fig. 1 is a schematic diagram showing an instrument in which the optical axis coincides with the true vertical, a planar reflecting surface set at an angle of 45 degrees thereto, and a horizontal line of sight reflected along the optical axis;

Fig. 2 is a schematic diagram illustrating that by principles of optics if the optical axis and planar reflecting surface are tilted at the angle $\alpha$ from the vertical, the line of sight will also be tilted at the angle $\alpha$ from the horizontal;

Fig. 3 is a schematic diagram illustrating by principles of optics that if the optical axis is tilted at the angle $\alpha$ from the vertical, and the planar reflecting surface is tilted at the angle $\frac{1}{2}\alpha$ from the vertical, the line of sight will not be deflected at the angle $\alpha$ but will remain at the horizontal;

Fig. 4 is a schematic diagram showing a flexural pivot or suspended cantilever beam portrayed graphically to permit mathematical analysis of the principles and derivation of the formulas on which the present invention is based;

Fig. 5 is a side elevation showing one embodiment of the automatic levelling and image stabilizing device attached to an optical instrument;

Fig. 6 is a central vertical section of the automatic levelling and image stabilizing device showing the device in detail and disclosing damping means therefor;

Fig. 7 is a vertical section taken on the line 7—7 of Fig. 6;

Fig. 8 is a horizontal section taken on the line 8—8 of Fig. 6;

Fig. 9 is a perspective view of the differential tilting assembly;

Fig. 10 is a detailed vertical section showing a different embodiment of the invention which discloses a preferred method for damping the differential tilting assembly;

Fig. 11 is a side elevation showing another embodiment of the invention adapted for use with and attached to an optical instrument whose principal alignment is substantially vertical, the device being shown in vertical section; and Fig. 12 is a side elevation showing an embodiment of a modified form of the invention adapted for use in combination with an instrument, such as an astrolabe, whose principal alignment is such that its optical axis is at a predetermined fixed angle when the instrument is level; the device is shown in vertical section.

In optics the angle of incidence is the angle between the normal to a reflecting surface and an incident ray, and the angle of reflection is the angle between the normal to a reflecting surface and a reflected ray. It is a principle of optics, known as the law of reflection, that the angle of reflection is equal to the angle of incidence and the incident ray, reflected ray and normal, all lie in the same plane. If the reflecting surface is planar, it follows that all the normals to it will be parallel and as a corollary to the law of reflection that all incident rays striking the planar reflecting surface at the same angle or at the complement to the angle of incidence will be reflected at an equal angle or at the complement of the angle of reflection. The illustrative embodiment (Fig. 1) of this principle shows that if a horizontal light ray coincident with the observed line of sight 12 and represented as a broken line impinges a planar reflecting surface 14 at an angle of 45 degrees or at the complement of the angle of incidence 16, it will be reflected from the planar surface 14 at an equal angle of 45 degrees or at the complement of the angle of reflection 18. Thus, if the planar reflecting surface 14 is set at an angle of 45 degrees from the true horizontal or level, an observed line of sight 12 at the horizontal or the light rays coincident with it will strike the planar reflecting surface 14 at a 45 degree angle and will also be reflected at a 45 degree angle along a true vertical line 20, and in the ideal or perfect arrangement, this reflected line of sight at the true vertical 20 will be coincident with the optical axis of the instrument 24 which is used for observation.

However, in actual practice, the theoretically perfect arrangement of line of sight, reflector, and instrument is seldom attainable due to the inherent error producing factors present in the spirit bubble method of levelling. Thus, in the situation that usually exists, the instrument 24 is tilted at some slight angle $\alpha$ from the true vertical line 20 (Fig. 2). Since the planar reflecting surface 14 remains at an angle of 45 degrees with the optical axis 22 of the instrument 24, the complement of the angle of reflection 18 will also perforce remain at an angle of 45 degrees; and since the angles of reflection and incidence are always equal, the complement of the angle of incidence 16 must also remain at 45 degrees. As the instrument 24 and its optical axis 22 are tilted from the true vertical by the angle $\alpha$, it follows that the observed line of sight 12 must also be tilted or deflected at the angle $\alpha$ from the true horizontal 26, or from a fixed angle in an instrument, such as an astrolabe where a line of sight at a predetermined fixed angle is desired.

If the instrument 24 is deflected or rotated from the true vertical 20 (Fig. 3) by any small angle $\alpha$, and the reflector 14 is rotated or deflected by one-half $\alpha$, or at a differential ratio of one-half to one with the instrument, then the complement of the angle of reflection 18 will be equal to 45 degrees plus or minus one-half $\alpha$ (45°±½$\alpha$) depending on whether the instrument 24 is tilted toward or away from the observed line of sight 12, and by the law of reflection the complement of the angle of incidence 16 must also be equal to 45 degrees plus or minus one-half $\alpha$ (45°±½$\alpha$). Thus, the total decrease or increase in the complements of the angles of reflection 18 and incidence 16 (½$\alpha$ each) or the sum of the two angles automatically compensates for the actual tilt $\alpha$, and the line of sight will remain at the horizontal or at a desired fixed angle even though the instrument itself is tilted.

The theoretical principles of mechanics of materials can be used to design a cantilever beam that will act as a flexurally pivoted suspension element and provide the desired rotational differential ratio of one-half to one between the planar reflecting surface 14 and the optical axis 22 of the instrument (Fig. 3). Further principles of mechanics of materials can be used to locate the static center of the cantilever. The illustrative diagram (Fig. 4) shows a cantilever beam 28 in the deflected position; the formulas for determining the length and static center of the cantilever beam which will give the required differential rotational ratio of one-half to one between its free and fixed ends and provide a stable and non-eccentric center of rotation can be derived from the relationships which are shown in this diagram (Fig. 4). It is to be understood that the static center of a given cantilever beam is the point of intersection of the tangents to the free and fixed ends of the beam when the beam is deflected. This point c (Fig. 4) remains stationary or fixed for all small flexures of the beam 28 and provides a stable and non-eccentric center of rotation. In the diagram (Fig. 4) the cantilever beam 28 is shown schematically in a deflected position; the fixed end is shown at 30, and the free end is at 32 with a concentrated load W shown acting vertically downward in the direction of gravity at the free end 32. To facilitate the derivation of the necessary equations or formulas, an X-axis is shown as the broken line —X——+X and said X-axis is coincident with the undeflected position of the beam 28. A Y-axis is designated by the broken line —Y——+Y normal to the X-axis and located so that the origin of the $x$ and $y$ coordinates is coincident with the undeflected free end 33 of the beam 28. For convenience, the concentrated load W is shown acting at the undeflected free end 33 of the beam 28 ($x=0$, $y=0$), or its center of gravity is shown coincident with the free end 33, and the weight of the beam itself is considered to be negligible or 0. It is obvious that the normal component $p$ (which acts along the Y-axis and bends the beam) of the total load W which acts vertically downward is as follows:

(1) $\qquad p = W \sin \alpha$ where $\alpha$ is equal to the angle by which the tangent at the fixed end 30 of the beam (coincident with the X-axis) is deflected from the vertical (or the angle of tilt of the optical axis of the instrument from the vertical), the true vertical being represented by the broken line V——V.

Also, the component $t$ (initially causing pure tension) of the total load W acts along or parallel to the X-axis and may be expressed as follows:

(2) $\qquad t = W \cos \alpha$

From the principles of resistance of materials it is known that the general formula (a differential equation) of the elastic curve of a beam is as follows:

(3) $\qquad M = \pm EI \dfrac{d^2 y}{dx^2}$ in which M is the bending moment, E is the modulus of elasticity of the material from which the beam is made, and I is the moment of inertia of a cross section of the beam.

Since the beam is straight before bending, the straight beam formula can be applied to determine the moment which tends to bend the beam. This moment is equal to the product of the normal component $p$ of the total load $W$ and the lever arm at which it acts or distance from the support 31, $x$, and is expressed as follows:

(4) $$M_1 = px$$

However, there is another moment opposing the moment $px$ which is developed by the eccentric tensile component of the load $W$ after deflection occurs. The straight-beam formula can also be applied to this opposing moment provided $y$ can be expressed as an appropriate straight line function of $x$. If the total deflection of the free end 32 of the beam along the Y-axis is equal to $\Delta$, then at a given point along the beam the opposing moment is equal to the product of the tensile component $t$ and the lever arm or distance at which it acts $\Delta - y$. This moment may be expressed as follows:

(5) $$M_2 = t(\Delta - y)$$

The justification for stating that $t(\Delta - y)$ is the opposing moment is as follows: first, the resisting moment of the beam itself is initially developed to oppose the exterior moment $px$; second, if the tensile component $t$ is considered alone, it is unrestrained in its tendency to re-align itself with the fixed end 30 and tends to return the beam to its original straightness, a tendency which, obviously, the beam itself does not resist; therefore, the moment $t(\Delta - y)$ aids the resisting moment of the beam, and it follows that the exterior moments $px$ and $t(\Delta - y)$ must oppose each other.

Since the moment $t(\Delta - y)$ opposes the moment $px$, it is a linear reduction of $px$ in the proportion that the final deflection of the beam is less than the deflection computed for $px$ alone. Accordingly, $y$ can be expressed as a linear function of $x$. It is known that for any particular small angle $\alpha$ when $x=0$, $y=\Delta$, and that when $y=0$, $x=L$, where $L$ is the effective length of the beam (Fig. 4). Therefore, if $y=0$ when $x=L$, $y$ must equal $(L-x)$ multiplied by some constant $c$, or $y$ can be expressed as $c(L-x)$. In order for the relationship $y=\Delta$, when $x=0$, to exist, it necessarily follows that $c$ is $\Delta/L$. Thus, (6) $$y = c(L - x)$$

where $c = \Delta/L$, and the exterior moment $t(\Delta - y)$ by substitution becomes $$t[\Delta - \Delta/L(L-x)] = \frac{tx\Delta}{L}$$

or (7) $$M_2 = txc$$

Since it is known that $M_1$ and $M_2$ or $px$ and $txc$ are opposing moments, it follows that the resultant exterior moment which acts on the beam is (8) $$M = M_1 - M_2$$

or (9) $$M = (p - ct)x$$

Substituting the above expression for $M$ into the equation for the general elastic curve, Equation 3, yields the following differential equation for all small angles $\alpha$:

(10) $$EI \frac{d^2y}{dx^2} = (p - ct)x$$

Integrating:

(11) $$EI \frac{dy}{dx} = \frac{(p - ct)x^2}{2}$$

when $$\frac{dy}{dx} = 0, \; x = L, \text{ therefore } C = -\frac{(p-ct)L^2}{2}$$

and

(12) $$EI \frac{dy}{dx} = \frac{(p-ct)x^2}{2} - \frac{(p-ct)L^2}{2}$$

Integrating again:

(13) $$EIy = \frac{(p-ct)x^3}{6} - \frac{(p-ct)(L^2x)}{2} + C \text{ when } y=0, \; x=L$$

therefore $$C = \frac{(p-ct)L^3}{2} - \frac{(p-ct)L^3}{6} = \frac{(p-ct)L^3}{3}$$

(14) $$EIy = \frac{(p-ct)x^3}{6} - \frac{(p-ct)L^2x}{2} + \frac{(p-ct)L^3}{3}$$

This is the uncollected form of the equation for all cantilever beams (the presumably negligible weight of the beam has not been considered) with a concentrated load at the free end.

To continue the derivation, the desired condition of the beam is that when its fixed upper end 30 is tilted from the vertical through a small angle $\alpha$ causing its free lower end 32 to be deflected through a distance $\Delta$, the slope of the tangent to its elastic curve at the free end will be one-half the slope (i.e. tilt) of the tangent at the fixed end from the vertical. This condition is satisfied by requiring that when $x=0$

(15) $$\frac{dy}{dx} = -\tan \frac{1}{2}\alpha$$

Substituting this value for $$\frac{dy}{dx}$$

into Equation 12 when $x=0$

(16) $$-EI \tan \frac{1}{2}\alpha = -\frac{(p-ct)L^2}{2}$$

For convenience and for all small values of $\alpha$, it may be said that $$\tan \frac{1}{2}\alpha = \frac{\tan \alpha}{2}$$

Substituting this expression for $\tan \frac{1}{2}\alpha$, and also the values $W \sin \alpha$ for $p$ from Equation 1 and $W \cos \alpha$ for $t$ from Equation 2 into Equation 16 and multiplying by 2 yields:

(17) $$EI \tan \alpha = W \sin \alpha L^2 - cW \cos \alpha L^2$$

(18) $$c = \frac{\Delta}{L} \text{ and } \tan \frac{1}{2}\alpha = \frac{\Delta}{L_1} \text{ or } \Delta = L_1 \tan \frac{1}{2}$$

therefore $$c = \frac{L_1 \tan \frac{1}{2}\alpha}{L} = \frac{L_1 \tan \alpha}{2L}$$

Substituting this value for $c$ into Equation 17 yields:

(19) $$EI \tan \alpha = W \sin \alpha L^2 - \frac{L_1 \tan \alpha W \cos \alpha L^2}{2L}$$

Multiplying by 2, combining terms, and reducing yields:

(20) $$2EI = 2L^2 W \cos \alpha - L.L_1 W \cos \alpha$$

Transposing and reducing gives the following result:

(21) $$L^2 = \frac{EI}{W \cos \alpha} + \frac{L.L_1}{2}$$

Referring to Equation 14, it is known that when $y=\Delta$, $x=0$, substitution of these values into Equation 14 yields:

(22) $$EI\Delta = \frac{(p-ct)L^3}{3}$$

Further substitution of the values $W \sin \alpha$, $W \cos \alpha$, $L_1 \tan \frac{1}{2}\alpha$, and $$\frac{L_1 \tan \frac{1}{2}\alpha}{L} \text{ for } p, t, \Delta, \text{ and } c$$

respectively, yields:

(23)
$$EIL_1 \tan \frac{1}{2}\alpha = \frac{W \sin \alpha L^3}{3} - \frac{\frac{L_1 \tan \frac{1}{2}\alpha}{L} W \cos \alpha L^3}{3}$$

Since $$\tan \frac{1}{2}\alpha = \frac{\tan \alpha}{2}$$

then:

(24)
$$\frac{EIL_1 \tan \alpha}{2} = \frac{L^3 W \sin \alpha}{3} - \frac{L_1 \tan \alpha W \cos \alpha L^2}{6L}$$

Multiplying by 6L, combining terms, and reducing yields:

(25)
$$L_1 = \frac{2W \cos \alpha L^3}{3EI} - \frac{L_1 W \cos \alpha L^2}{3EI}$$

Selecting $\alpha$ small enough that $\cos \alpha$ can be eliminated from consideration Equation 21 reduces to:

(26)
$$L^2 = \frac{EI}{W} + \frac{L \cdot L_1}{2}$$

and Equation 25 reduces to:

(27)
$$L_1 = \frac{2WL^3}{3EI} - \frac{L_1 WL^2}{3EI}$$

By trial and error substitutions it is found that if $L_1$ is given the value $2/3L$, a simultaneous solution of Equations 26 and 27 is obtained as follows:

Substituting the value $2/3L$ for $L_1$ in Equation 26 yields:

(28)
$$L^2 = \frac{EI}{W} + \frac{L^2}{3}$$

Transposing, combining terms, and reducing yields:

(29)
$$L = \sqrt{\frac{3EI}{2W}}$$

Similar substitution in Equation 27 yields:

(30)
$$\frac{2L}{3} = \frac{2WL^3}{3EI} - \frac{2WL^3}{9EI}$$

Reducing and combining terms yields:

(31)
$$\frac{4WL^3}{9EI} = \frac{2L}{3}$$

which reduces to:

(32)
$$L = \sqrt{\frac{3EI}{2W}}$$

Therefore, it may be stated that when Equations 26 and 27 are solved simultaneously, they respectively reduce to:

(33)
$$L = \sqrt{\frac{3EI}{2W}}$$

and

(34)
$$L_1 = 2/3L$$

Thus, assuming that a vertically disposed cantilever beam with a concentrated load W at its free end is designed so that its effective length is equal to $$\sqrt{\frac{3EI}{2W}}$$

it has been mathematically proven that when the fixed end is deflected from the vertical through a small angle $\alpha$, then the free end will be deflected from the vertical through the angle $\frac{1}{2}\alpha$ or at a differential ratio of one-half to one with the fixed end. Also, it has been proven that the static center of such a beam is located on the tangent to the free end at a point from the free end equal to $2/3$ of the length of the beam.

In the illustrative embodiment of the invention (Fig. 5) the differentiating flexurally pivoted differential tilting assembly 61 is shown enclosed in and supported by its housing 34 which is attached by an adapter ring 36 and set screw 38 to the objective end of an optical instrument 40 (in this case, a surveyor's level). Of course, a simple equivalent supporting means could be used in place of the housing 34 which would not necessarily enclose any part of the pendulum itself 61. The observed line of sight 12 is shown passing through a transparent circular cover plate 42 in the lower part of the housing 34 and striking the lower planar mirror or reflecting surface 44 of the automatic levelling device.

In the detailed central vertical section view of the automatic levelling device (Fig. 6), the observed line of sight 12 passes through the circular cover plate 42 which is mounted opposite the objective aperture 46 of the housing front plate 35 on a supporting ring 48 which is concentric with the objective aperture and integral with the housing front plate 35 and projecting from it around the outer circumference of the objective aperture 46. The cover plate 42 acts as a windshield and prevents wind from interfering with the proper functioning of the differential tilting assembly.

The key elements of the differential tilting assembly 61 are the differentiating flexural pivots, or resilient suspension elements, beams 52 which, in the present embodiment, are made from a thin strip of metal of a length between its free and fixed ends approximately equal to $$\sqrt{\frac{3EI}{2W}}$$

It should be noted that this length is true provided the resilient suspension elements and load are assembled and function as a simple cantilever with a concentrated load at its free end. If the resilient suspension elements are not simple cantilevers, for example, strips with a tapered width or depth, or the load is not concentrated exactly at the free end, it is understood that the actual length must be an equivalent length appropriate for the variation in the cantilever system or its loading so that the desired rotational characteristics are obtained. Obviously the equivalent lengths and locations of static centers of various types of cantilever systems, including various locations of the concentrated load, can be derived by mechanics of materials principles in a manner similar to that used previously in the description as an example. At its upper end each resilient suspension element, flexural pivot, or beam 52 is rigidly fixed or clamped between an upper beam support 54 and an upper beam fastener 56, the fasteners 56 being firmly attached to the supports 54 by suitable fastening means extending through the upper end of the resilient suspension element, flexural pivot, or beam 52, clamping it between the supports 54 and fasteners 56. Each of the upper beam supports 54 is in turn firmly attached to each of the housing side plates 60 at a height to provide satisfactory location of the entire pendulum 61 (Fig. 9).

To the lower end of the resilient suspension elements 52 are secured a mirror support bar 62 and a lower beam fastener 64 in a manner such that the lower ends of the resilient suspension elements or flexural pivots 52 are firmly clamped by the mirror support bar 62 and lower beam fastener 64 by fastening means extending through the fastener 64 and the lower end of the beams 52 into the mirror support bar 62. The mirror support bar 62 is secured to the block 66 and said block 66 has a centrally located threaded aperture 68. The threaded aperture 68 is supplied with an adjustment plug 70, and this plug 70 can be screwed up or down inside the threaded aperture 68 to change the location of the center of gravity of the entire pendulum 61. Thus, if in manufacture the resilient suspension elements or flexural pivots 52 are not constructed of exactly the proper length called for by the derived formula, Equation 33, their effective length and static centers may be adjusted through shifting the center of gravity in the aforesaid manner. Furthermore, as the formula was derived on the assumption that the beam supported a concentrated load at its free end and whereas the load supported by the beam is actually spread over a considerable area and its center of gravity may not coincide with a line through the free ends of the resilient suspension elements, the adjustment plug 70 may be included in the structure in order to adjust the center of gravity of the load until it meets the theoretical conditions on which the derivation of the formula is based.

Once the differential tilting assembly 61 has been constructed, it may be adjusted for proper operation by the simple expedient of attaching the automatic levelling device in which it is housed to an optical instrument, such as a level, and testing it to see if a horizontal line of sight or stabilized observed image is obtained when the instrument itself is tilted both fore and aft; preferably while sighting a distant object, or for the most nearly perfect adjustment, an infinitive light source such as is obtained through well known instrument collimators. If the automatic levelling device is working properly, the same horizontal line of sight will be obtained for both of these conditions, i.e. when the instrument is tilted forward or down and when it is tilted back or up, or in other words, image stabilization will be secured. If the same horizontal line of sight is obtained, the horizontal cross-wire of the level will intersect the sighted object or image at the same point regardless of whether the optical axis of the instrument is tilted up or down and the image will be stabilized. However, if the device is not adjusted properly, the horizontal cross-wire will intersect the sighted object or image at a different point when the instrument is tilted up from that point where it intersects it when the instrument is tilted down and the image will not be stabilized. If this occurs, all that is necessary to bring the device into proper adjustment is for the operator to screw the adjustment plug 70 up or down, observing his results after each adjustment, until the automatic levelling device is functioning properly, or until image stabilization is obtained. Thus, the theoretically correct effective length of the beam for a given differential tilting assembly under different conditions may be obtained empirically by the method of trial and error adjustment just described.

In the differential tilting assembly 61, the lower mirror plate 45 is rigidly attached to the mirror support bar 62 and the lower planar mirror 44 is in turn firmly secured to the lower mirror plate 45 (Fig. 6). The upper mirror post 76 is secured to the upper housing plate 78 and the upper mirror plate 80 is, in turn, secured to the upper mirror post 76. The upper planar mirror or reflecting suface 82 is firmly attached to the upper mirror plate 80 and the entire upper mirror assembly is fastened so that the upper mirror itself 82 rests at a 45 degree angle to the horizontal when the optical instrument is level, or when the resilient suspension elements or flexural beams 52 hang coincident with the true vertical. The upper mirror assembly of the differential tilting assembly 61 is enclosed in the housing 34 which is comprised of the housing front plate 35, two housing side plates 60, housing back plate 86, upper housing plate 78, and lower housing plate 88. The lower housing plate 88 is apertured to permit access to the adjustment plug 70. Means for air damping of the differential tilting assembly 61 is provided within the housing 34. This air damping means is comprised of a damping plate 90 which is secured to two damping bars 92 which are in turn secured to the lower housing plate 88. One of the damping bars 92 rests against the lower inside part of the housing front plate 35, and on top of the lower housing plate 88, and the other damping bar 92 rests against the lower inside of the housing back plate 86 and on top of the lower housing plate 88. The air damping of the differential tilting assembly 61 is achieved by leaving a narrow gap or tolerance between the block 66, the two damping bars 92, the housing side plates 60, the damping plate 90, and the lower housing plate 88, so that the resistance of the air to compression between the block 66 and the surfaces of the elements forming the damping chamber acts to bring the differential tilting assembly 61 to rest quickly, helps prevent minor oscillations, and tends to stabilize the differential tilting assembly 61 in the attitude it assumes due to the gravitational force acting on it. The lower connecting bar 62 and lower beam fastener 64 pass through a rectangular aperture in the damping plate 90 when the unit is assembled, and the rectangular aperture is of sufficient size to permit slight to and fro movement of the differential tilting assembly.

In the illustration of a modified means of damping (Fig. 10) a fluid damping method is disclosed as distinguished from the air damping method previously explained. In the instant modified form, the upper end of a connecting element or shaft 94 is secured to the bottom of a modified block 95, passes through the aperture in the modified lower housing plate 98, and has an adjustable damping disc 96 attached to its lower end. Both the adjustable damping disc 96 and connecting element or shaft 94 are threaded so that the adjustable damping disc 96 may be moved up or down on the connecting element or shaft 94 by rotation of the disc 96 relative to the shaft 94. The up or down movement of the damping disc 96 may be used to shift the center of gravity of the differential tilting assembly 61; thus, the disc 96 in the fluid damping method replaces the adjustment plug 70 used in the air damping method and is used for the same functional purposes, viz. changing the effective length of the beam until a proper adjustment is obtained. Consequently, it will be noted, that in the fluid damping method the threaded aperture is omitted from the modified block 95 and that the block forms one solid piece.

The parts above the line 10—10 (Fig. 10) are all identical with those shown in the first embodiment which uses the air damping method (Figs. 6, 7, 8 and 9) with the exception of the modified block 95 which is solid instead of being provided with a threaded aperture. The aperture of the modified lower housing plate 98 used with the fluid damping method is threaded, rather than plain, to receive a threaded aperture tube 100. The aperture tube 100 extends downward from its seat in the modified lower housing plate 98 and is flared at its lower end to prevent capillarity with the damping fluid 102. The damping fluid 102 should be a fluid which is relatively inert, with a low freezing point, high boiling point and low coefficient of expansion. A reservoir 104 is attached to the modified lower housing plate 98 and serves to hold the damping fluid 102. Reservoir 104 is provided with a removable plug 106, which is seated in its bottom. It should be noted that the adjustable damping disc 96 can be any convenient size and shape consistent with its function of providing adjusting means and efficient damping action as it moves to and fro in the fluid 102. In the fluid damping method illustrated, the damping action is obtained through the resistance of movement of the adjustable damping disc 96 and the fluid 102, since the damping disc 96 is rigidly attached to the modified block 95 by means of the connecting element or shaft 94, and any to and fro movement of the differential tilting assembly 61 will thus be resisted by the cooperative action of the fluid 102 and adjusting disc 96.

The fluid damping means is designed so that should the entire assembly be inverted, none of the fluid 102 will escape from the reservoir 104. This feature of operation is achieved by constructing the adjustable damping disc 96 of greater diameter than the lower end of the aperture tube 100 so that when the assembly is turned upside down the fluid runs off the sides of the damping disc 96 and comes to rest in the upper part of the reservoir 104 in the space formed by the sides of the aperture tube 100, the upper walls of the reservoir 104, and the modified lower housing plate 98, instead of running out. Thus, this principle of operation also makes it possible to remove the plug 106 when the instrument is turned upside down without loss of the fluid 102 in the reservoir 104 and permits easy access to and adjustment of the disc 96 in this position.

In the operation of the embodiment of the invention shown in Figs. 6, 7, 8 and 9, if the instrument 40 is tilted at a small angle $\alpha$ from the horizontal the upper planar mirror 82 and the fixed or upper ends of the resilient suspension elements or flexural beams 52 will also be tilted at the angle $\alpha$ from their position when the instrument is horizontal. However, the lower planar mirror 44 and lower mirror plate 45, due to the special construction of the resilient suspension elements or flexural beams 52 such that their effective length is the equivalent in effect to the $$\sqrt{\frac{3EI}{2W}}$$

for a simple cantilever with a concentrated load at its free end, will only be tilted at an angle equal to $\frac{1}{2}\alpha$ or $\frac{1}{2}$ the angle of tilt of the upper planar mirror. Thus, the lower planar mirror 44 rotates at a differential ratio of $\frac{1}{2}$ to one with the upper planar mirror 82 which is the theoretically desired condition shown in Fig. 3, viz. the complements of the angles of incidence and reflection on the lower planar mirror differ from their value when the instrument is level by $\frac{1}{2}\alpha$ and the sum of the differences is equal to $\alpha$ and compensates for the angle of tilt on the instrument for all small values of $\alpha$. Hence, the observed line of sight enters the automatic levelling device through the cover plate 42 and strikes the planar reflecting surface of the lower mirror 44 at an angle (complement of the angle of incidence) which is equal to 45 degrees $+$ or $-$ $\frac{1}{2}\alpha$ and is reflected as the reflected line of sight 22 at an equal angle to the upper planar mirror 82 which it strikes at an angle of 45 degrees due to the compensating effect of the lower mirror. By the corollary to the law of reflection the line of sight is reflected from the upper planar mirror 82 at an equal angle of 45 degrees and since the upper planar mirror 82 is constructed at an angle of 45 degrees with the optical axis 41 of the instrument 40, the reflected line of sight will coincide with this optical axis 41.

A further embodiment of the invention is shown in Fig. 11. The principal alignment of the optical instrument 112 in this embodiment is vertical, i.e. when the instrument 112 is level, its optical axis 114 coincides with the true vertical. Since the optical axis 114 is substantially vertical, it is unnecessary to employ the upper planar mirror 82 of the previous embodiment (Figs. 6, 7, 8 and 9), and the automatic levelling device functions in the usual manner with the observed line of sight 12 being reflected from a planar mirror 116 in coincidence with the optical axis 114. The planar mirror 116 is supported from the free ends of resilient suspension elements or flexural beams 118 and its center line is made to approximately coincide with the axis of the static centers of the pivots as in the previous embodiment. Thus, for all small angles of tilt $\alpha$ of the optical axis 114 from the vertical, the differential rotational ratio of the planar mirror 116 with respect to the rotation of the optical axis 114 from the vertical is equal to one half to one which, by the corollary of the law of reflection compensates for the angle of tilt $\alpha$.

An additional embodiment of the invention is shown in Fig. 12. In this form, the invention is disclosed in use in conjunction with an astrolabe or optical instrument 120 whose optical axis 122 is set at some predetermined fixed angle from the horizontal. A planar mirror 124 is mounted in the usual manner, however, in this embodiment the mirror 124 is supported at the horizontal above the mirror support bar 62 and lower beam fastener 64 by mirror support posts 128 and the desired observed line of sight 126 is at 45 degrees with the horizontal. The operation of the device is identical with that disclosed in the previous embodiments except that the desired line of sight will remain at the predetermined angle of 45 degrees instead of at the horizontal, even though the instrument itself 120 is not level and its optical axis 122 is tilted from its desired position by some small angle $\alpha$.

For absolute accuracy of the automatic levelling device in any of the embodiments presented the lower planar mirror 44 (Fig. 7) should be set so that its horizontal center line 108 coincides with the axis 110 formed by the line joining the static centers of the resilient suspension elements or flexural beams 52. If the center line 108 coincides with the axis of static centers 110, then for all small angles of tilt $\alpha$ the center line 108 and the axis of rotation of the planar mirror 44 will also coincide because the axis of static centers 110 experiences no vertical or horizontal displacement for all small values of $\alpha$ by definition; also from the derivation of the formula it is known that in a theoretically perfect resilient suspension element or flexural beam the static center C (Fig. 4) is located at a point two-thirds of the effective length L from the free end 32 of the beam.

It is further desirable that the axis of static centers 110 and center line 108 should pass as close as practicable to the tilting point of the instrument, i.e. the point about which the instrument is mechanically pivoted for the purpose of approximate levelling, such as a ball and socket joint or other conventional pivot means. However, it is not essential that these lines and points coincide in normal practice, e.g. with a builder's type dumpy level, because the errors introduced are so small that their influence cannot be detected, and they are sufficiently compensated for by normal adjustment of the instrument. On the other hand, the accuracy desired of some special surveying and astronomical instruments (Figs. 11 and 12) requires the ultimate in precision of manufacture and use; and for such instruments it is, of course, desirable that the axis of static centers 110, the center line 108, and the tilting point of the instrument coincide as nearly as practicable.

The present invention thus provides an automatic levelling and image stabilizing device for precise instruments in which the differential angular rotational ratio of one-half to one between the free and fixed ends of the resilient suspension element and the location of the center of the suspended planar reflecting surface at the static center of the resilient suspension element are considered as critical. It also provides a modified device for less precise instruments in which only the differential rotational ratio of one-half to one when sighting on an infinitely distant target is considered critical, and the location of the center of the suspended planar reflecting surface approximately at the static center is considered desirable but not necessary and of secondary importance.

Having thus described my invention, what I claim as new and wish to secure by Letters Patent is:

1. A resiliently controlled differential tilting assembly adapted to be associated in aligned relation with the optical train of an optical instrument including an objective to insure that a predetermined relation is maintained between an observed line of sight including light rays coincident therewith and the optical axis of the optical system when the optical instrument is tilted through a small angle relative to the normal to the observed line of sight, said assembly comprising a support for attachment to the instrument adjacent to its objective, a suspended resilient differentially flexurally pivoted cantilever beam having an upper end portion and a lower end portion, said upper end portion fixed relative to and held by the support means and said lower end portion hanging free, said resilient differentially flexurally pivoted cantilever beam having a static center defined by the intersection of tangents to the fixed and free ends of said cantilever beam, a weight of a given magnitude carried at the extremity of the lower end portion, a suspended planar reflecting surface forming a portion of said weight and reflecting the light rays coincident with the observed line of sight into the optical train of the instrument, the weight having a center of gravity located adjacent to the extremity of the lower end portion of the cantilever beam, the center of gravity so positioned that when the extremity of the upper end portion is deflected responsively to a deflection of the instrument through an angle α from the normal to the observed line of sight of a magnitude not greater than that for which $$\frac{\tan \alpha}{2}$$

is substantially equal to tan ½α, the extremity of the lower end portion including the reflecting surface which it supports will be deflected through the angle ½α maintaining an observed line of sight at a predetermined attitude through the optical train of the optical instrument when the instrument is tilted at a small angle relative to the normal to the observed line of sight.

2. A structure as recited in claim 1 wherein the differential tilting assembly includes a damping attachment, the weight includes an adjustable element for shifting the position of its center of gravity with respect to the free end of the resilient differentially flexurally pivoted suspension element, the support includes a second planar reflecting surface fixed in relation thereto, said second reflecting surface located in mutually spaced relation and coacting with the suspended planar reflecting surface whereby the observed line of sight reflected from the suspended reflecting surface strikes the second reflecting surface and is in turn reflected from it into the optical system of the instrument, and the support also includes a housing enclosing and supporting the differential tilting assembly, said housing having an aperture adjacent the suspended reflecting surface permitting the observed line of sight to strike said reflecting surface.

3. A resiliently controlled differential tilting assembly adapted to be associated adjacent to and in aligned relation with the optical system of an optical instrument to maintain an observed line of sight through the optical system of the optical instrument at a predetermined attitude when said optical instrument is tilted through a small angle relative to the normal to the observed line of sight, said assembly comprising a support mounted on the instrument adjacent to its objective, resilient differentially flexurally pivoted suspension element having one end fixed to and depending from said support, a weight attached to and having its center of gravity coincident with the free end of the resilient differentially flexurally pivoted suspension element, a planar reflecting surface forming a portion of said weight, the said resilient differentially flexurally pivoted suspension element having physical properties interrelated in conformity with the formula $$L = \sqrt{\frac{3EI}{2W}}$$

wherein L is the effective length of the resilient differentially flexurally pivoted suspension element, E is its modulus of elasticity, I is the moment of inertia of its cross section, and W is the weight which it carries.

4. A structure as recited in claim 3 wherein the differential tilting assembly includes a damping attachment, the weight includes an adjustable element for shifting the position of its center of gravity with respect to the free end of the resilient differentially flexurally pivoted suspension element, the support includes a second planar reflecting surface fixed in relation thereto, said second reflecting surface located in mutually spaced relation and coacting with the suspended planar reflecting surface whereby the observed line of sight reflected from the suspended reflecting surface strikes the second reflecting surface and is in turn reflected from it into the optical system of the instrument, and the support also includes a housing enclosing and supporting the differential tilting assembly, said housing having an aperture adjacent the suspended reflecting surface permitting the observed line of sight to strike said reflecting surface.

5. A resiliently controlled differential tilting assembly adapted to be associated in aligned relation with the optical system of an optical instrument including an objective to insure that a predetermined relation is maintained between an observed line of sight including light rays coincident therewith and the optical axis of the optical system when the optical instrument is tilted through a small angle relative to the normal to the observed line of sight, said assembly comprising a support means for attachment to the instrument adjacent to its objective, a gravitationally controlled resilient differentially flexurally pivoted suspension means of a given material, length, and cross sectional configuration, free at its lower end and fixed relative to the support means at its upper end, a weight of a given magnitude supported by the lower free end of the suspension means and having its center of gravity positioned adjacent to said free end, a suspended planar reflecting surface forming a portion of said weight and having an attitude to reflect light rays coincident with the observed line of sight into the optical system of the instrument, the suspension means having a static center defined by the intersection of tangents to the fixed and free ends of said resilient differentially flexurally pivoted suspension means, dividing said suspension means into an upper portion and a lower portion, said planar reflecting surface being disposed so that its center coincides with the static center of the resilient differentially flexurally pivoted suspension means whereby when the fixed end of said upper portion is deflected responsively to a deflection of the instrument through an angle α from the normal to the observed line of sight of a magnitude not greater than that for which $$\frac{\tan \alpha}{2}$$

is substantially equal to tan ½α, the free end of said lower portion including the reflecting surface which it supports will be deflected through the angle ½α.

6. A structure as recited in claim 5 wherein the weight includes an adjustable element for shifting the position of its center of gravity with respect to the free end of the resilient differentially flexurally pivoted suspension means.

7. A resiliently controlled differential tilting assembly adapted to be associated in aligned relation with the optical system of an optical instrument including an objective to insure that a predetermined relation is maintained between an observed line of sight including light rays coincident therewith and the optical axis of the optical system when the optical instrument is tilted through a small angle relative to the normal to the observed line of sight, said assembly comprising a support for attachment to the instrument adjacent to its objective, a gravitationally controlled resilient differentially flexurally pivoted suspension means of a given material, length, and cross sectional configuration, free at its lower end and fixed relative to the support at its upper end, a weight of a given magnitude supported by the lower free end of the suspension means and having its center of gravity positioned adjacent to said free end, a suspended first planar reflecting surface forming a portion of said weight, a second planar reflecting surface fixed in relation to and held by the support, the first reflecting surface having an attitude to reflect light rays coincident with the observed line of sight onto the second reflecting surface, the second reflecting surface located in mutually spaced relation with and coacting with the first reflecting surface whereby the light rays reflected from the first reflecting surface strike the second reflecting surface and are in turn reflected from it into the optical system of the instrument, said suspension means having a static center defined by the intersection of tangents to the fixed and free ends of said resilient differentially flexurally pivoted suspension means, dividing said suspension means into an upper portion and a lower portion, said first planar reflecting surface disposed so that its center coincides with the static center of the resilient differentially flexurally pivoted suspension means whereby when the fixed end of said upper portion is deflected responsively to a deflection of the instrument through an angle $\alpha$ from the normal to the observed line of sight of a magnitude not greater than that for which $$\frac{\tan \alpha}{2}$$

is substantially equal to tan ½α, the free end of said lower portion including the first reflecting surface which it supports will be deflected through the angle ½α maintaining an observed line of sight at a predetermined attitude through the optical system of the optical instrument when the instrument is tilted at a small angle relative to the normal to the observed line of sight.

8. A structure as recited in claim 5 wherein the assembly includes a fluid damping structure comprising a suspended connecting element depending from and forming a portion of the weight, an adjustable damping disc also forming a portion of the weight and adjustably attached to the connecting element to permit shifting the position of the center of gravity of the weight relative to the free end of the resilient differentially flexurally pivoted suspension means, a reservoir having an aperture in its upper portion beneath the weight, a fluid within the reservoir into which the damping disc is adapted to be partially immersed to effect damping, an aperture tube secured in the aperture and extending into the reservoir, the suspended connecting element extending through the aperture tube, the damping disc having a diameter greater than the diameter of the aperture tube, the volume of the fluid and the diameter of the aperture tube being such that when the fluid damping attachment is inverted or at an intermediate angle, the fluid drains from the sides of the damping disc into a chamber defined by the space formed by the upper portion of the reservoir and the sides of the aperture tube.

9. A differential tilting assembly adapted to be used in connection with an automatic levelling apparatus, said assembly comprising a housing, a resilient differentially flexurally pivoted suspension element having a fixed upper end secured to said housing and a free lower end, a weight suspended from and having a center of gravity coincident with the lower free end of said resilient differentially flexurally pivoted suspension element, a planar reflecting surface forming a portion of said weight, said resilient differentially flexurally pivoted suspension element having physical properties interrelated in conformity with the formula $$L=\sqrt{\frac{3EI}{2W}}$$

wherein L is the effective length of said resilient differentially flexurally pivoted suspension element, E is its modulus of elasticity, I is the moment of inertia of its cross section, and W is the magnitude of the weight suspended from it, said resilient differentially flexurally pivoted suspension element also having a static center located on the tangent to its lower free end at a point equal to 2/3L from the lower free end toward the fixed upper end, the planar reflecting surface so disposed that its center coincides with the static center of said resilient differentially flexurally pivoted suspension element.

References Cited in the file of this patent

UNITED STATES PATENTS

| 1,524,788 | Gardner | Feb. 3, 1925 |
| 1,553,078 | Henderson | Sept. 8, 1925 |
| 2,779,231 | Drodofsky | Jan. 29, 1957 |

FOREIGN PATENTS

| 29,462 | Great Britain | Dec. 19, 1910 |
| 178,209 | Austria | Apr. 26, 1954 |

OTHER REFERENCES

Little Astrolabes (Equiangulators), Report No. 791, Technical Staff, The Engineers Board, Corps of Engineers, U.S. Army, Fort Belvoir, Va., Feb. 5, 1944; pp. 37–39 and 76 relied on.

"Technical Instructions for 60° Pendulum Astrolabe," published by Engineer School, Ft. Belvoir, Va., 1945, pages 7, 10–12 relied on.

Civil Engineering, "New Military Surveying Equipment," W. S. Little, vol. 15, No. 6, June 1945, pp. 276–278.

Brusaglioni: "J. Moderni Livelli Autolivellanti," Atti della Fondazioni G. Ronchi (Italy), vol. 9, No. 4; July 1954; pp. 259–272.